(12) United States Patent
Tanaka et al.

(10) Patent No.: US 11,973,210 B2
(45) Date of Patent: Apr. 30, 2024

(54) NEGATIVE ELECTRODE FOR NONAQUEOUS ELECTROLYTE SECONDARY BATTERIES AND NONAQUEOUS ELECTROLYTE SECONDARY BATTERY INCLUDING THE SAME

(71) Applicant: HONDA MOTOR CO., LTD., Tokyo (JP)

(72) Inventors: Toshimitsu Tanaka, Saitama (JP); Kiyoshi Tanaami, Saitama (JP); Takashi Mukai, Osaka (JP); Yuta Ikeuchi, Osaka (JP); Taichi Sakamoto, Osaka (JP); Naoto Yamashita, Osaka (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 17/585,585

(22) Filed: Jan. 27, 2022

(65) Prior Publication Data

US 2022/0246904 A1    Aug. 4, 2022

(30) Foreign Application Priority Data

Feb. 1, 2021    (JP) ................. 2021-014560

(51) Int. Cl.
*H01M 4/00* (2006.01)
*H01M 4/134* (2010.01)
(Continued)

(52) U.S. Cl.
CPC ........... *H01M 4/134* (2013.01); *H01M 4/621* (2013.01); *H01M 4/663* (2013.01); *H01M 2004/027* (2013.01)

(58) Field of Classification Search
CPC ...... H01M 4/663; H01M 4/134; H01M 4/621; H01M 2004/027; Y02E 60/10
See application file for complete search history.

(56) References Cited

U.S. PATENT DOCUMENTS 10,586,977 B1 *  3/2020  Sella ................... H01M 4/0416
2016/0380270 A1  12/2016  Lee et al.
(Continued)

FOREIGN PATENT DOCUMENTS

EP    3937279 A1    1/2022
JP    6149147 B1    6/2017
(Continued)

OTHER PUBLICATIONS

Mukai et al, Positive Electrode For Nonaqueous Electrolyte Secondary Battery And Battery Using The Same, Jan. 10, 2019. See the Abstract. (Year: 2019).*

*Primary Examiner* — Cynthia H Kelly
*Assistant Examiner* — Monique M Wills
(74) *Attorney, Agent, or Firm* — CKC & PARTNERS CO., LLC

(57) ABSTRACT

To provide a negative electrode for nonaqueous electrolyte secondary batteries, by which the structural deterioration of the electrode is suppressed and cycle characteristics can be improved by absorbing the expansion and contraction of a silicon-based active material placed in the inside of a current collector made of porous metal, and a nonaqueous electrolyte secondary battery including the same. A negative electrode for nonaqueous electrolyte secondary batteries, having a current collector made of porous metal, and a negative electrode material placed in pores of the porous metal, the negative electrode material including a negative electrode active material including a silicon-based material; a skeleton (Continued)

forming agent including a silicate having a siloxane bond; a conductive additive; a binder; and a fibrous material.

7 Claims, 2 Drawing Sheets

(51) Int. Cl.
  *H01M 4/62* (2006.01)
  *H01M 4/66* (2006.01)
  H01M 4/02 (2006.01)

(56) References Cited

U.S. PATENT DOCUMENTS

2019/0326601 A1 10/2019 Sakamoto et al.
2020/0251740 A1 8/2020 Mukai et al.

FOREIGN PATENT DOCUMENTS

| JP | 2018101623 A | 6/2018 | |
|----|---|---|---|
| JP | 6369818 B2 | 8/2018 | |
| JP | 2019003959 A | * 1/2019 | ............. Y02E 60/10 |

* cited by examiner

NEGATIVE ELECTRODE FOR NONAQUEOUS ELECTROLYTE SECONDARY BATTERIES AND NONAQUEOUS ELECTROLYTE SECONDARY BATTERY INCLUDING THE SAME

This application is based on and claims the benefit of priority from Japanese Patent Application No. 2021-014560, filed on 1 Feb. 2021, the content of which is incorporated herein by reference.

BACKGROUND OF THE INVENTION

Field of the Invention

The present invention relates to a negative electrode for nonaqueous electrolyte secondary batteries, and a nonaqueous electrolyte secondary battery including the same.

Related Art

In recent years, nonaqueous electrolyte secondary batteries such as lithium-ion secondary batteries are small and light and also have high power, and thus have been increasingly used for e.g. cars. The nonaqueous electrolyte secondary battery is a battery system using an electrolyte, which does not contain water as a main component, as the electrolyte thereof, and is a generic name for storage devices which can be charged and discharged. For example, lithium-ion batteries, lithium polymer batteries, all-solid-state lithium batteries, lithium air batteries, lithium sulfur batteries, sodium ion batteries, potassium ion batteries, multivalent ion batteries, fluoride batteries, sodium sulfur batteries and the like are known. This nonaqueous electrolyte secondary battery includes mainly a positive electrode, a negative electrode and an electrolyte. In addition, when an electrolyte has fluidity, the nonaqueous electrolyte secondary battery further includes a separator between the positive electrode and the negative electrode.

For the purpose of improving battery life, for example, a technique in which a skeleton forming agent including a silicate having a siloxane bond is allowed to exist at least on the surface of an active material and the skeleton forming agent is allowed to permeate from the surface to the inside thereof is disclosed (see e.g. Patent Document 1). Because a strong skeleton can be formed on an active material by this technique, it is considered that the battery life can be improved. In addition, a technique for applying the above skeleton forming agent to a negative electrode including a silicon (Si)-based active material is also disclosed (see e.g. Patent Document 2).

Patent Document 1: Japanese Patent No. 6369818
Patent Document 2: Japanese Patent No. 6149147

SUMMARY OF THE INVENTION

In the above nonaqueous electrolyte secondary batteries, incidentally, an improvement in energy density has been demanded. It is considered that in order to improve energy density, an increase in the film thickness of a negative electrode and an increase in the density of the amount of a negative electrode active material are effective. By conventional techniques, however, the thickness of the negative electrode is limited in the production of negative electrodes. Specifically, the practical thickness of a film thickness, at which a mixture layer can be applied to conventional current collector foil, is less than 100 μm. When the film thickness is 100 μm or more, problems such as coating unevenness, cracks and peeling are caused, and it is difficult to produce a high accuracy negative electrode.

In addition, because of a balance between the binding power of a binder and the expansion and contraction of a negative electrode active material, the amount of the negative electrode active material per unit area is limited from the viewpoint of durability. Specifically, the limit of the capacity of a negative electrode active material per unit area is about 4 mAh/cm$^2$ (film thickness 50 μm), and when the capacity is equal to or greater than the limit, sufficient cycle characteristics cannot be retained. Conversely, when the capacity of an active material is less than 4 mAh/cm$^2$, an improvement in energy density cannot be expected.

In order to solve the above problems, it is considered to use porous metal for a negative electrode current collector for nonaqueous electrolyte secondary batteries and to pack an electrode mixture in the porous metal. In a case where in nonaqueous electrolyte secondary batteries, a current collector made of porous metal, an electrode active material including a silicon-based material as a negative electrode active material, and a skeleton forming agent to coat the current collector and the electrode active material are used for the negative electrode, it has been found that the deterioration of porous metal itself and disconnection of conductive paths occur as changes over time by the expansion and contraction of the silicon-based active material caused during charge and discharge. In a nonaqueous electrolyte secondary battery to which such negative electrode is applied, it has been also found that structural deterioration occurs in the inside of the electrode by repeating charge and discharge, and thus battery performance, particularly cycle characteristics dramatically become deteriorated.

Therefore, a negative electrode for nonaqueous electrolyte secondary batteries, by which the structural deterioration of the electrode is suppressed and cycle characteristics can be improved by absorbing the expansion and contraction of a silicon-based active material placed in the inside of a current collector made of porous metal, and a nonaqueous electrolyte secondary battery including the same are demanded.

The present invention was made in view of the above, and an object thereof is to provide a negative electrode for nonaqueous electrolyte secondary batteries, by which the structural deterioration of the electrode is suppressed and cycle characteristics can be improved by absorbing the expansion and contraction of a silicon-based active material placed in the inside of a current collector made of porous metal, and a nonaqueous electrolyte secondary battery including the same.

(1) To achieve the above object, the present invention provides a negative electrode for nonaqueous electrolyte secondary batteries, having a current collector made of porous metal, and a negative electrode material placed in pores of the porous metal, the negative electrode material including a negative electrode active material including a silicon-based material; a skeleton forming agent including a silicate having a siloxane bond; a conductive additive; a binder; and a fibrous material.

(2) In the negative electrode for nonaqueous electrolyte secondary batteries in (1), the fibrous material may be at least one selected from the group consisting of cellulose nanofiber, vapor grown carbon nanofiber, and carbon nanotube.

(3) In the negative electrode for nonaqueous electrolyte secondary batteries in (2), the aspect ratio of the cellulose nanofiber may be 2.5 to 5000.

(4) In the negative electrode for nonaqueous electrolyte secondary batteries in (2) or (3), the aspect ratio of the vapor grown carbon nanofiber may be 0.83 to 100.

(5) In the negative electrode for nonaqueous electrolyte secondary batteries in any one of (2) to (4), the aspect ratio of the carbon nanotube may be 2.5 to 5000.

(6) In the negative electrode for nonaqueous electrolyte secondary batteries in any one of (1) to (5), the skeleton forming agent may include a silicate represented by general formula (1) below:
[Chem. 1]

$$A_2O \cdot nSiO_2 \qquad \text{formula (1)}$$

[in the above general formula (1), A represents an alkali metal].

(7) In the negative electrode for nonaqueous electrolyte secondary batteries in any one of (1) to (6), the porous metal may be a foamed metal.

(8) The present invention also provides a nonaqueous electrolyte secondary battery, including the negative electrode for nonaqueous electrolyte secondary batteries in any one of (1) to (7).

According to the present invention, it is possible to provide a negative electrode for nonaqueous electrolyte secondary batteries, by which the structural deterioration of the electrode is suppressed and cycle characteristics can be improved by absorbing the expansion and contraction of a silicon-based active material placed in the inside of a current collector made of porous metal, and a nonaqueous electrolyte secondary battery including the same.

DETAILED DESCRIPTION OF THE INVENTION

One embodiment of the present invention will now be described in detail with reference to the drawings.

Negative Electrode

Figure 1:
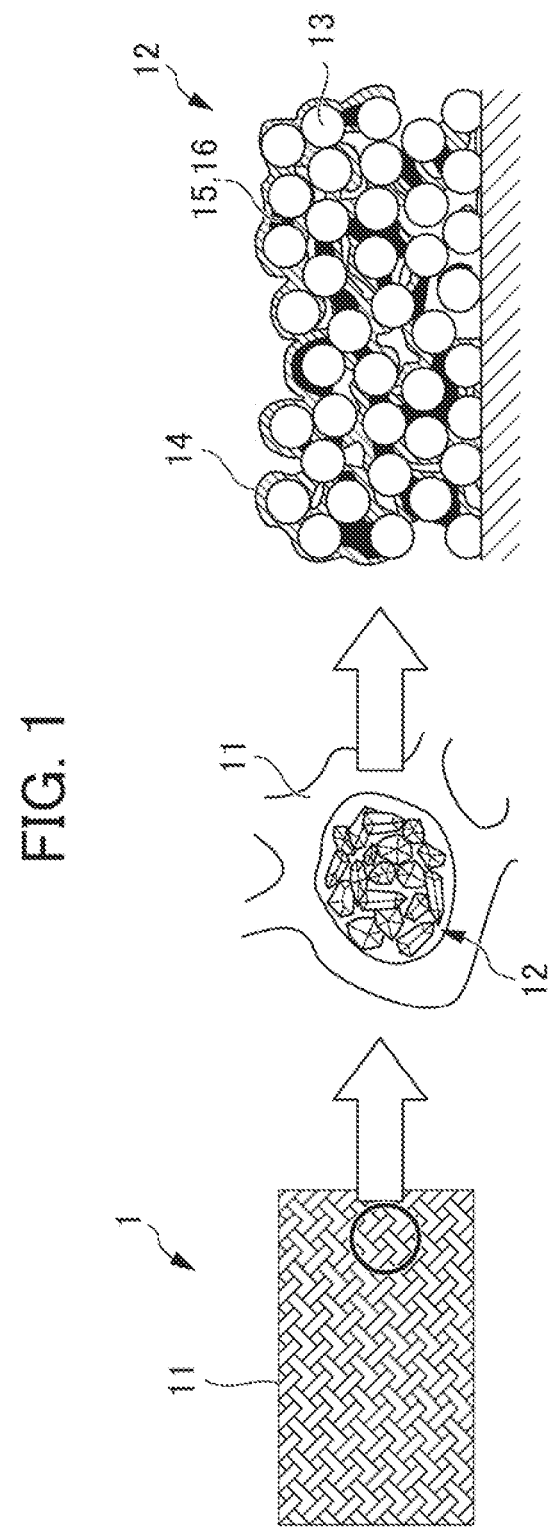
FIG. 1 is a drawing which schematically shows the constitution of a negative electrode for nonaqueous electrolyte secondary batteries according to one embodiment of the present invention.

FIG. 1 is a drawing which schematically shows the constitution of a negative electrode 1 for nonaqueous electrolyte secondary batteries according to the present embodiment. The negative electrode 1 for nonaqueous electrolyte secondary batteries according to the present embodiment has a current collector 11 made of porous metal, and a negative electrode material 12 placed in pores of the porous metal. In addition, the negative electrode material 12 includes a negative electrode active material 13 including a silicon-based material, a skeleton forming agent 14 including a silicate having a siloxane bond, a conductive additive 15, a binder 16 and a fibrous material 17. For example, by using the present embodiment for a negative electrode for lithium-ion secondary batteries, it is possible to provide a negative electrode for nonaqueous electrolyte secondary batteries, by which the fibrous material 17 absorbs the expansion and contraction of the silicon-based active material placed in the inside of the current collector made of porous metal, and thus the structural deterioration of the electrode is suppressed and cycle characteristics can be improved, and a nonaqueous electrolyte secondary battery including the same. A case where the present embodiment is used for a negative electrode for lithium-ion secondary batteries will now be described in detail. It should be noted, however, that a variety of additions, modifications or deletions can be made without departing from the spirit of the present invention.

As the current collector 11, a current collector 11 made of porous metal is used. A mesh, a woven fabric, a non-woven fabric, an embossed metal, a punched metal, an expanded metal, a foam and the like are shown as examples, and a metal foam is preferably used. Among these, a metal foam having a three dimensional network structure with continuous pores is preferably used, and for example Celmet (registered trademark) (manufactured by Sumitomo Electric Industries, Ltd.) and the like can be used.

The material of porous metal is not particularly limited as long as it is a material which has electron conductivity and can apply current to a retained electrode material, and, for example, conductive metals such as Al, Al alloys, Ni, Fe, Cu, Ti, Cr, Au, Mo, W, Ta, Pt, Ru and Rh, conductive alloys containing two or more of these conductive metals (stainless steel (such as SUS304, SUS316, SUS316L and YUS270) and the like can be used. In addition, when using a material other than the above conductive metals or conductive alloys, for example, a multi-layered structure of different metals in which Fe is covered with Cu or Ni may be used. Among these, because electron conductivity and reduction-resistant properties are excellent, Ni or a Ni alloy is preferably used.

The thickness of porous metal is preferably 10 μm or more and more preferably 50 μm or more. The thickness of porous metal is preferably 1 mm or less and more preferably 500 μm or less.

The average pore diameter of porous metal is preferably 500 μm or less. When the average pore diameter of porous metal is within this range, a distance between the negative electrode active material 13 packed or supported in the inside of porous metal and the metal skeleton becomes stable, and electron conductivity is improved to suppress an increase in the internal resistance of a battery. In addition, even when volume changes occur with charge and discharge, falling of an electrode mixture can be suppressed.

The specific, surface area of porous metal is preferably 1000 to 10000 $m^2/m^3$. This is twice to 10 times larger than the specific surface area of conventionally common current collector foil. When the specific surface area of porous metal is within this range, the contact properties of an electrode mixture and the current collector 11 are improved and an increase in the internal resistance of a battery is suppressed. The specific surface area is more preferably 4000 to 7000 $m^2/m^3$.

The porosity of porous metal is preferably 90 to 99%. When the porosity of porous metal is within this range, the amount of an electrode mixture packed can be increased, and the energy density of a battery is improved. Specifically, when the porosity is above 99%, the mechanical strength of porous metal is significantly reduced, and the porous metal is easily broken by changes in the volume of an electrode with charge and discharge. Conversely, when the porosity is less than 90%, not only the amount of an electrode mixture packed is reduced, but also the ion conductivity of an electrode is reduced, and thus it is difficult to obtain sufficient input and output characteristics. From these viewpoints, the porosity is more preferably 93 to 98%.

The basis weight of the electrode of porous metal is preferably 1 to 100 mg/cm². When the basis weight of the electrode by porous metal is within this range, the capacity of an active material can be sufficiently expressed, and the capacity as designed as the electrode can be shown. The basis weight of the electrode is more preferably 5 to 60 mg/cm².

As the negative electrode active material 13, one which can reversibly absorb and release lithium ion is used, and specifically a negative electrode active material including a high capacity of silicon-based material is used. Elemental silicon, silicon alloys, silicon oxides, silicon compounds and the like correspond to the silicon-based material. Here, elemental silicon indicates crystalline or amorphous silicon with a purity of 95 mass % or more. The silicon alloys mean Si-M alloys including silicon and another transition element M. Examples of: M include Al, Mg, La, Ag, Sn, Ti, Y, Cr, Ni, Zr, V, Nb, Mo and the like, and the silicon alloy may be an all-proportional solid solution alloy, a eutectic alloy, a hypo-eutectic alloy, a hyper-eutectic alloy or a peritectic alloy. The silicon oxides mean oxides of silicon or composites including elemental silicon and $SiO_2$, and the element ratio of Si and O is only required to be 1 and 1.7 or less. The silicon compounds are substances in which silicon and other two or more elements are chemically bound. Among these, elemental silicon is preferred because an interfacial layer described below can be formed well. Alternatively, a substance in which a carbon-based material is mixed or composited with a silicon-based material can be also used.

The shape of the silicon-based materiel is not particularly limited, and the material may be spherical, oval, faceted, strip, fibrous, flake, doughnut-shaped or hollow powder, and these may be in single grain shape or agglomerated shape.

The negative electrode active material 13 including a silicon-based material has an expansion coefficient of 10% or more by charge and discharge. That is, although the negative electrode active material 13 largely expands arid contracts during charge and discharge, breaking of conductive paths and durability deterioration by such expansion and contraction can be suppressed by using the skeleton forming agent 14 and the fibrous material 17 described below.

The particle diameter of the silicon-based material is preferably 1.0 μm to 15 μm from the viewpoint of obtaining excellent cycle characteristics of the electrode and high input and output characteristics.

The negative electrode active material 13 may also include a carbon-based material (such as graphite, hard carbon or soft carbon) in addition to the above silicon-based material.

As the skeleton forming agent 14, a skeleton forming agent 14 including a silicate having a siloxane bond is used. More specifically, the skeleton forming agent 14 preferably includes a silicate represented by general formula (1) below:
[Chem. 2]

$$A_2O \cdot nSiO_2 \qquad \text{formula (1)}.$$

In the above general formula (1), A represents an alkali metal. In particular, A is preferably at least any one of lithium (Li), sodium (Na) and potassium (K). A lithium-ion secondary battery with high strength, excellent heat resistance and excellent cycle life is obtained by using such alkali metal salt of silicic acid having a siloxane bond as the skeleton forming agent.

In the above general formula (1), n is preferably 1.6 or more and 3.9 or less. When n is within this range, moderate viscosity is obtained when the skeleton forming agent 14 and water are mixed to form a skeleton forming agent liquid, and when the liquid is applied to a negative electrode including silicon as the negative electrode active material 13 as described below, the skeleton forming agent 14 easily permeates into the negative electrode material 12. This further ensures that a lithium-ion secondary battery with high strength, excellent heat resistance and excellent cycle life is obtained.

n is more preferably 2.0 or more and 3.5 or less.

The above silicate is preferably an amorphous silicate. Amorphous silicates have an unregulated molecular arrangement, and thus unlike crystals do not break in a particular direction. Because of this, cycle life characteristics are improved by using an amorphous silicate as the skeleton forming agent 14.

The skeleton forming agent 14 permeates between the negative electrode active materials 13, for example, by applying the above skeleton forming agent, liquid to a negative electrode including silicon as the negative electrode active material 13. At this time, it is presumed that silicon to make the negative electrode active material 13 and the above silicate to make the skeleton forming agent 14 are mixed, and, for example, a hydrolyzed silicate is then dehydrated by heating (condensation reaction of silanol group) to form a siloxane bond (—Si—O—Si—). That is, in the negative electrode 1 for lithium-ion secondary batteries in the present embodiment, an interfacial layer including an inorganic substance is formed on the interface between the negative electrode active material 13 and the skeleton forming agent 14, and in this interfacial layer, silicon derived from the siloxane bond and an alkali metal generated from e.g. hydrolysis of a silicate are included. It is presumed that the negative electrode active material 13 and the skeleton forming agent 14 are strongly bound by the existence of the interfacial layer to obtain excellent cycle life characteristics.

In the present embodiment, the proportion of an alkali metal atom to all atoms to make the interfacial layer is preferably higher than the proportion of the alkali metal atom to all atoms to make the skeleton forming agent 14. More specifically, the proportion of an alkali metal atom to all atoms to make the interfacial layer is preferably 5 times or more higher than the proportion of the alkali metal atom to all atoms to make the skeleton forming agent 14. Because of this, the bond of the negative electrode active material 13 and the skeleton forming agent 14 becomes stronger. Therefore, peeling by the expansion and contraction of the negative electrode active material 13 during charge and discharge, and wrinkles and cracking of the current collector 11 are further suppressed, and cycle life is further improved.

The thickness of the above interfacial layer is preferably 3 to 30 nm. When the thickness of the interfacial layer is within this range, the bond of the negative electrode active material 13 and the skeleton forming agent 14 becomes stronger. Therefore, peeling by the expansion and contraction of the negative electrode active material 13 during charge and discharge, and wrinkles and cracking of the current collector 11 are further suppressed, and cycle life is further improved.

The skeleton forming agent 14 of the present embodiment may include a surfactant. Because of this, the lyophilic properties of the skeleton forming agent 14 in the negative electrode material 12 are improved, and the skeleton forming agent 14 uniformly permeates into the negative electrode material 12. Therefore, a uniform skeleton is formed among the negative electrode active materials 13 in the negative electrode material 12 and cycle life characteristics are further improved.

The amount of the skeleton forming agent 14 included in the negative electrode material 12 (density) is preferably 0.5 to 2.0 mg/cm$^2$. When the amount of the skeleton forming agent 14 included in the negative electrode material 12 is within this range, the above-described effect by using the skeleton forming agent 14 is more certainly displayed.

When the total solid content in the negative electrode active material 13, the skeleton forming agent 14, the conductive additive 15, the binder 16 and the fibrous material 17 is considered to be 100 mass %, the amount of the skeleton forming agent 14 included is preferably 3.0 to 40.0 mass %. When the amount of the skeleton forming agent 14 included is within this range, the above-described effect by using the skeleton forming agent 14 is more certainly displayed. When the amount of the skeleton forming agent 14 included in the negative electrode material 12 is 3.0 mass % or more, the function of the skeleton forming agent 14 is more sufficiently obtained. In addition, when the amount of the skeleton forming agent 14 included is 40 mass % or less, a reduction in energy density can be further prevented. The amount of the skeleton forming agent 14 included is more preferably 5.0 to 30.0 mass %.

Here, in the negative electrode 1 for nonaqueous electrolyte secondary batteries of the present embodiment, the skeleton forming agent 14 is placed at least on the interface with the current collector 11 in the negative electrode material 12. More specifically, the skeleton forming agent 14 is uniformly placed not only on the interface between the current collector 11 and the negative electrode material 12, but also in the whole negative electrode material 12, and is dispersed among the negative electrode active materials 13. Conversely, in conventional negative electrodes for nonaqueous electrolyte secondary batteries, the skeleton forming agent unevenly exists on the surface of a negative electrode material.

The negative electrode 1 for lithium-ion secondary batteries according to the present embodiment includes the conductive additive 15. The conductive additive 15 is not particularly restricted as long as it has electron conductivity, and metal, a carbon material, a conductive polymer, a conductive glass or the like can be used. Specific examples thereof include acetylene black (AB), ketjen black (KB), furnace black (FB), thermal black, lamp black, channel black, roller black, disc black, carbon black (CB), carbon fiber (e.g. vapor grown carbon fiber VGCF (registered trademark)), carbon nanotube (CNT), carbon nanohorn, graphite, graphene, glassy carbon, amorphous carbon and the like, and one or two or more of these can be used.

When the total of the negative electrode active material 13, the conductive additive 15, the binder 16 and the fibrous material 17 included in the negative electrode material 12 is considered to be 100 mass %, the amount of the conductive additive 15 included is preferably 0 to 20.0 mass %. When the amount of the conductive additive 15 included is within this range, conductivity can be improved without reducing the capacity density of the negative electrode, and voids which can retain a sufficient amount of the skeleton forming agent 14 in the inside of the negative electrode material 12 can be formed. The amount of the conductive additive 15 included is more preferably 8.8 to 25.0 mass %.

The conductive additive 15 of the present embodiment has preferably a bulk density of 0.04 to 0.25 mg/cm$^3$. When the bulk density of the conductive additive 15 is within this range, the above-described skeleton forming agent 14 can be sufficiently impregnated, and the above-described effect by the skeleton forming agent 14 can be sufficiently displayed. The bulk density of the conductive additive 15 is more preferably 0.04 to 0.15 mg/cm$^3$.

The negative electrode 1 for lithium-ion secondary batteries according to the present embodiment includes the binder 16. As the binder 16, for example, organic materials may be used individually, such as polyvinylidene difluoride (PVdF), polytetrafluoroethylene (PTFE), polyimide (PI), polyamide, polyamide-imide, aramid, polyacryl, styrene butadiene rubber (SBR), ethylene-vinyl acetate copolymer (EVA), styrene-ethylene-butylene-styrene copolymer (SEBS), carboxymethyl cellulose (CMC), xanthan gum, polyvinyl alcohol (PVA), ethylene vinylalcohol, polyvinyl butyral (PVB), ethylene vinylalcohol, polyethylene (PE), polypropylene (PP), polyacrylic acid, lithium polyacrylate, sodium polyacrylate, potassium polyacrylate, ammonium polyacrylate, methyl polyacrylate, ethyl polyacrylate, amine polyacrylate, polyacrylic acid ester, epoxy resin, polyethylene terephthalate (PET), polybutylene terephthalate (PBT), nylon, polyvinyl chloride, silicone rubber, nitrile rubber, cyanoacrylate, urea formaldehyde resin, melamine resin, phenol resin, latex, polyurethane, silylated urethane, nitrocellulose, dextrin, polyvinylpyrrolidone, vinyl acetate, polystyrene, chloropropylene, resorcinol resin, polyaromatics, modified silicone, methacrylate resin, polybutene, butyl rubber, 2-propenoic acid, cyanoacrylic acid, methyl methacrylate, glycidyl methacrylate, acrylic oligomer, 2-hydroxyethyl acrylate, alginic acid, starch, lacquer, sucrose, glue, casein and cellulose nanofiber, or two or more of these may be used in combination.

In addition, a binder obtained by mixing each of the above organic binders and an inorganic binder may be used. Examples of inorganic binders include silicate-based, phosphate-based, sol-based, cement-based binders and the like. For example, inorganic materials may be used individually, such as lithium silicate, sodium silicate, potassium silicate, cesium silicate, guanidine silicate, ammonium silicate, hexafluorosilicate, borates, aluminic acid lithium salt, aluminic acid sodium salt, aluminic acid potassium salt, aluminosilicate, lithium aluminate, sodium aluminate, potassium aluminate, polyaluminum chloride, polyaluminum sulfate, polyaluminum sulfate silicate, aluminum sulfate, aluminum nitrate, ammonium alum, lithium alum, sodium alum, potassium alum, chrome alum, iron alum, manganese alum, nickel ammonium sulfate, diatomite, polyzirconoxane, polytantaloxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, fumed calcia, titania sol, colloidal titania, fumed titania, zeolite, silicoaluminophosphate zeolite, sepiolite, montmorillonite, kaolin, saponite, aluminum phosphate, magnesium phosphate, calcium phosphate, iron phosphate, copper phosphate, zinc phosphate, titanium phosphate, manganese phosphate, barium phosphate, tin phosphate, low-melting glass, plaster, gypsum, magnesium cement, litharge cement, portland cement, blast furnace cement, fly ash cement, silica cement, phosphate cement, concrete and solid electrolyte, or two or more of these may be used in combination.

In the present embodiment, because the negative electrode active material 13 and the skeleton forming agent 14 are strongly bound by the above-described interfacial layer formed by using the skeleton forming agent 14, all of the above-described binders can be used. When the total of the negative electrode active material 13, the conductive additive 15, the binder 16 and the fibrous material 17 included in the negative electrode material 12 is considered to be 100 mass %, the amount of the binder 16 included is preferably 0.1 to 60 mass %. When the amount of the binder 16 included is within this range, ion conductivity can be improved without reducing the capacity density of the negative electrode, high mechanical strength is obtained, and more excellent cycle life characteristics are obtained. The amount of the binder 16 included is more preferably 0.5 to 30 mass %.

The negative electrode 1 for lithium-ion secondary batteries according to the present embodiment includes the fibrous material 17. The fibrous material 17 is not particularly restricted as long as it is a material which has a high aspect ratio (long axis length/short axis length) among materials used as the above conductive additive 15 and binder 16, and metal, a carbon material, a conductive polymer, a conductive glass or the like can be used. Specific examples thereof include acetylene black (AB), ketjen black (KB), furnace black (FB), thermal black, lamp black, channel black, roller black, disc black, carbon black (CB), carbon fiber (e.g. vapor grown carbon fiber, VGCF (registered trademark)), nanocarbon fiber, carbon nanotube (CNT), carbon nanohorn, graphite, graphene, glassy carbon, amorphous carbon, polyvinylidene difluoride (PVdF), polytetrafluoroethylene (PTFE), polyimide (PI), polyamide, polyamide-imide, aramid, polyacryl, styrene butadiene rubber (SBR), ethylene-vinyl acetate copolymer (EVA), styrene-ethylene-butylene-styrene copolymer (SEBS), carboxymethyl cellulose (CMC), xanthan gum, polyvinyl alcohol (PVA), ethylene vinylalcohol, polyvinyl butyral (PVB), ethylene vinylalcohol, polyethylene (PE), polypropylene (PP), polyacrylic acid, lithium polyacrylate, sodium polyacrylate, potassium polyacrylate, ammonium polyacrylate, methyl polyacrylate, ethyl polyacrylate, amine polyacrylate, polyacrylic acid ester, epoxy resin, polyethylene terephthalate (PET), polybutylene terephthalate (PBT), nylon, polyvinyl chloride, silicone rubber, nitrile rubber, cyanoacrylate, urea formaldehyde resin, melamine resin, phenol resin, latex, polyurethane, silylated urethane, nitrocellulose, dextrin, polyvinylpyrrolidone, vinyl acetate, polystyrene, chloropropylene, resorcinol resin, polyaromatics, modified silicone, methacrylate resin, polybutene, butyl rubber, 2-propenoic acid, cyanoacrylic acid, methyl methacrylate, glycidyl methacrylate, acrylic oligomer, 2-hydroxyethyl acrylate, alginic acid, starch, lacquer, sucrose, glue, casein, cellulose nanofiber (CNF) and the like, and one or two or more of these can be used. When using carbon nanotube, any of single walled carbon nanotube (SWCNT) and multi walled carbon nanotube (MWCNT) may be used.

Figure 2:
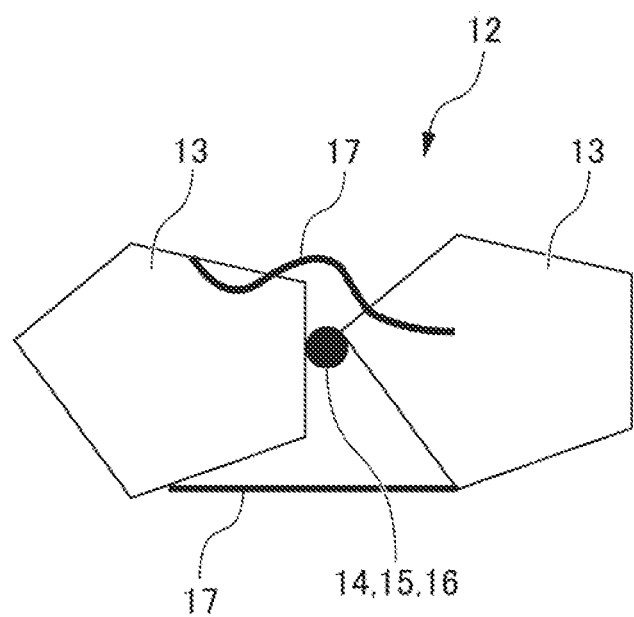
FIG. 2 is a drawing which schematically shows the constitution of a negative electrode material in the negative electrode for nonaqueous electrolyte secondary batteries according to one embodiment of the present invention.

In the negative electrode 1 for nonaqueous electrolyte secondary batteries of the present embodiment, the fibrous material 17 is placed at least on the surface of the negative electrode material 12, specifically the surface of the negative electrode active material 13. More specifically, the fibrous material 17 is placed not only on the surface of the negative electrode material 12 but also in the whole negative electrode material 12. When the fibrous material 17 has a long fiber length and a high aspect ratio, it is presumed that the fibrous material 17 is dispersed and exists adhering as cross-linked to the surface formed by the negative electrode active materials 13 as shown in FIG. 2. As a result, it is presumed that because the expansion and contraction of the negative electrode active material 13 can be absorbed, the structural deterioration of the electrode is also suppressed, and moreover breaking of conductive paths can be prevented, an improvement in cycle durability can be achieved When the total of the negative electrode active material 13, the conductive additive 15, the binder 16 and the fibrous material 17 included in the negative electrode material 12 is considered to be 100 mass %, the amount of the fibrous material 17 included is preferably 0 to 20.0 mass %. When the amount of the fibrous material included is within this range, conductivity can be improved without reducing the capacity density of the negative electrode. Also, the structural deterioration of the electrode and breaking of conductive paths are suppressed, and cycle characteristics can be improved by absorbing the expansion and contraction of the negative electrode active material. The amount of the fibrous material included is more preferably 0.1 to 5 mass %.

When the fibrous material 17 of the present embodiment is cellulose nanofiber, the fiber diameter (short axis length) is preferably 0.001 to 0.02 μm. When the fiber diameter of cellulose nanofiber is within this range, the above-described effect by the fibrous material 17 can be sufficiently displayed.

When the fibrous material 17 is cellulose nanofiber, the cellulose nanofiber preferably has a fiber length (long axis length) of 0.5 to 5 μm. When the fiber length of cellulose nanofiber is within this range, the above-described effect by the fibrous material 17 can be sufficiently displayed. The fiber length of the fibrous material is more preferably 1 to 4 μm. When the fibrous material 17 of the present embodiment is cellulose nanofiber, the aspect ratio is preferably 2.5 to 5000. When the aspect ratio of cellulose nanofiber is within this range, the above-described effect by the fibrous material 17 can be sufficiently displayed. The aspect ratio of cellulose nanofiber is more preferably 50 to 4000.

When the fibrous material 17 of the present embodiment is vapor grown carbon fiber, the fiber diameter (short axis length) is preferably 0.05 to 0.6 μm. When the fiber diameter of vapor grown carbon fiber is within this range, the above-described effect by the fibrous material 17 can be sufficiently displayed. The fiber diameter of vapor grown carbon fiber is more preferably 0.1 μm to 0.5 μm. When the fibrous material 17 of the present embodiment is vapor grown carbon fiber, the fiber length (long axis length) is preferably 0.5 to 5 μm. When the fiber length of vapor grown carbon fiber is within this range, the above-described effect by the fibrous material 17 can be sufficiently displayed. The fiber length of vapor grown carbon fiber is more preferably 1 to 4. When the fibrous material 17 of the present embodiment is vapor grown carbon fiber, the aspect ratio is preferably 0.83 to 100. When the aspect ratio of the fibrous material 17 is within this range, the above-described effect by the fibrous material 17 can be sufficiently displayed. The aspect ratio of vapor grown carbon fiber is more preferably 2 to 40.

When the fibrous material 17 of the present embodiment s carbon nanotube, the fiber diameter (short axis length) is preferably 0.001 to 0.02 μm. When the fiber diameter of carbon nanotube is within this range, the above-described effect by the fibrous material 17 can be sufficiently displayed. The fiber diameter of the fibrous material is more preferably 0.001 μm to 0.01 μm. When the fibrous material 17 of the present embodiment is carbon nanotube, the fiber length (long axis length) is preferably 0.5 to 5 μm. When the fiber length of the fibrous material 17 is within this range, the above-described effect by the fibrous material 17 can be sufficiently displayed. The fiber length of carbon nanotube is more preferably 1 to 4 μm. When the fibrous material 17 of the present embodiment is carbon nanotube, the aspect ratio is preferably 2.5 to 5000. When the aspect ratio of the fibrous material 17 is within this range, the above-described effect by the fibrous material 17 can be sufficiently displayed. The aspect ratio of carbon nanotube is more preferably 50 to 4000.

The thickness of the negative electrode 1 for nonaqueous electrolyte secondary batteries of the present embodiment having the above constitution is preferably 50 µm to 1000 µm. When the thickness of the negative electrode 1 for nonaqueous electrolyte secondary batteries is within this range, durability deterioration can be suppressed, and also energy density can be improved compared to those of conventional electrodes. The thickness of the negative electrode 1 for nonaqueous electrolyte secondary batteries is more preferably 150 µm to 800 µm.

In the negative electrode 1 for nonaqueous electrolyte secondary batteries of the present embodiment, the distance between the current collector 11 made of porous metal and the negative electrode active material 13 is preferably 50 µm or less. When the distance between the current collector 11 made of porous metal and the negative electrode active material 13 is 50 µm or less, durability deterioration can be suppressed. The distance between the current collector 11 made of porous metal and the negative electrode active material 13 is more preferably 30 µm or less.

Positive Electrode

A positive electrode when making a lithium-ion secondary battery using the above-described negative electrode will now be described. The positive electrode active material is not particularly limited as long as it is a positive electrode active material which is commonly used for lithium-ion secondary batteries. For example, alkali metal transition metal oxide-based, vanadium-based, sulfur-based, solid solution-based (lithium-rich-based, sodium-rich-based, potassium-rich-based), carbon-based and organic substance-based positive electrode active materials are used.

As is the case with the above-described negative electrode, the positive electrode for lithium-ion secondary batteries of the present embodiment may include a skeleton forming agent. As the skeleton forming agent, the same as for the above-described negative electrode can be used, and the preferred amount of the skeleton forming agent included is also the same as for the negative electrode.

The positive electrode for lithium-ion secondary batteries of the present embodiment may include a conductive additive. As the conductive additive, a variety of conductive additives described above which can be used for negative electrodes are used. The preferred amount of the conductive additive included is also the same as for the negative electrode.

The positive electrode for lithium-ion secondary batteries of the present embodiment may include a binder. As the binder, for example, organic materials may be used individually, such as polyvinylidene difluoride (PVdF), polytetrafluoroethylene (PTFE), hexafluoropropylene, tetrafluoroethylene, polyacryl and alginic acid, or two or more of these may be used in combination. Binders obtained by mixing these organic binders and inorganic binders may be also used. Examples of inorganic binders include silicate-based, phosphate-based, sol-based, cement-based binders and the like.

The current collector used for the positive electrode is not particularly limited as long as it is a material which has electron conductivity and can apply current to a retained positive electrode active material. For example, conductive substances such as C, Ti, Cr, Ni, Cu, Mo, Ru, Rh, Ta, W, Os, Ir, Pt, Au and Al, and alloys containing two or more of these conductive substances (e.g. stainless steel and Al—Fe alloy) can be used. When using a substance other than the above conductive substances, for example, a multi-layered structure of different metals in which iron is covered with Al or different elements in which Al is covered with C may be used. The current collector is preferably C, Ti, Cr, Au, Al, stainless steel or the like from the viewpoint of high electroconductivity and high stability in an electrolyte solution, and moreover is preferably C, Al, stainless steel or the like from the viewpoint of oxidation resistance and material costs. It is more preferably Al or an Al alloy which is covered with carbon, or stainless steel which is covered with carbon.

It should be noted that as the shape of the current collector used for the positive electrode, there are line, rod, plate, foil and porous shapes, and among these, the porous shape may be used because packing density can be increased and the skeleton forming agent easily permeates into the active material layer. Examples of the porous shape include a mesh, a woven fabric, a non-woven fabric, an embossed metal, a punched metal, an expanded metal or a foam and the like. The same porous metal as for the negative electrode may be used.

Separator

In the lithium-ion secondary battery of the present embodiment, as a separator, those which are commonly used for lithium-ion secondary batteries can be used. For example, a polyethylene microporous film, a polypropylene microporous film, a glass non-woven fabric, an aramid non-woven fabric, a polyimide microporous film, a polyolefin microporous film and the like can be used as the separator.

Electrolyte

In the lithium-ion secondary battery of the present embodiment, as an electrolyte, those which are commonly used for lithium-ion secondary batteries can be used. Examples thereof include an electrolyte solution in which an electrolyte is dissolved in a solvent, a gel electrolyte, a solid electrolyte, an ionic liquid and a molten salt. Here, the electrolyte solution indicates a solution in which an electrolyte is dissolved in a solvent.

Because the electrolyte for the lithium-ion secondary battery is required to contain lithium ion as a carrier for electric conduction, the electrolyte salt is not particularly limited as long as it is an electrolyte salt which is used for lithium-ion secondary batteries, and lithium salt is suitable. As this lithium salt, at least one or more selected from the group consisting of lithium hexafluorophosphate ($LiPF_6$), lithium perchlorate ($LiClO_4$), lithium tetrafluoroborate ($LiBF_4$), lithium trifluoromethanesulfonate ($LiCF_3SO_4$), lithium bistrifluoromethanesulfonylimide ($LiN(SO_2CF_3)_2$), lithium bispentafluoroethanesulfonylimide ($LiN(SO_2C_2F_5)_2$), lithium bis oxalato borate ($LiBC_4O_8$) and the like can be used, or two or more of these can be used in combination.

The solvent for the electrolyte is not particularly limited as long as it is a solvent which is used for lithium-ion secondary batteries, and for example, at least one selected from the group consisting of propylene carbonate (PC), ethylene carbonate (EC), dimethyl carbonate (DMC), diethyl carbonate (DEC), ethylmethyl carbonate (EMC), g-butyrolactone (GBL), methyl-g-butyrolactone, dimethoxymethane (DMM), dimethoxyethane (DME), vinylene carbonate (VC), vinylethylene carbonate (EVC), fluoroethylene carbonate (FEC) and ethylene sulfite (ES) can be used, or two or more of these can be used in combination.

In addition, the concentration of electrolyte solution (the concentration of salt in a solvent) is not particularly limited, and is preferably 0.1 to 3.0 mol/L and further preferably 0.8 to 2.0 mol/L.

The ionic liquid and molten salt are classified into e.g. pyridine-based, alicyclic amine-based, aliphatic amine-based ionic liquids and molten salts by the type of cation (positive ion). A variety of ionic liquids or molten salts can be synthesized by selecting the type of anion (negative ion) which is combined with the cation. Examples of cation used are ammonium-based ions e.g. imidazolium salts and pyridinium salts, phosphonium-based ions, inorganic ions and the like, and examples of anion used are halogen-based ions such as bromide ion and triflate, boron-based ions such as tetraphenyl borate, phosphorus-based ions such as hexafluorophosphate, and the like.

The ionic liquid and molten salt, can be obtained by, for example, a known synthesis method in which a cation such as imidazolium and an anion such as $Br^-$, $Cl^-$, $BF_4^-$, $PF_6^-$, $(CF_3SO_2)_2N^-$, $CF_3SO_3^-$ or $FeCl_4^-$ are combined. The ionic liquid and molten salt can function as an electrolyte solution without adding an electrolyte.

The solid electrolytes are classified into e.g. sulfide-based, oxide-based, hydride-based and organic polymer-based electrolytes. Many of these are amorphous and crystalline substances including a salt, which is a carrier, and an inorganic derivative. Unlike an electrolyte solution, a flammable aprotic organic solvent is not required, and thus ignition of gas and liquid, liquid leakage and the like do not easily occur, and it is expected that secondary batteries with excellent stability are obtained.

Production Method

The method for producing a lithium-ion secondary battery according to the present embodiment will now be described. The method for producing a negative electrode for lithium-ion secondary batteries according to the present embodiment has a first step of forming a negative electrode layer precursor by coating a negative electrode material including a negative electrode active material, a conductive additive, a binder and a fibrous material on a current collector and drying. For example, a nickel porous material with a thickness of 1000 μm is produced, and a nickel porous body is prepared by winding the material in roll form in advance, As the negative electrode material, a negative electrode active material, a conductive additive, a binder, a fibrous material and the like are mixed with N-methyl-2-pyrrolidone to prepare a paste slurry. Next, the negative electrode material slurry is packed and coated in the inside of the nickel porous body, dried and then treated with adjusted pressure to obtain a negative electrode layer precursor.

It should be noted that the negative electrode layer precursor may be used in a wet state without drying as described above. In addition to the above slurry coating, for example, there is a method in which using a chemical plating method, a sputtering method, a vapor deposition method, a gas deposition method, a dipping method, a press fit method, a chemical vapor deposition method (CVD), an atomic layer deposition method (ALD) or the like, a negative electrode active material layer is formed in the inside of a porous current collector by a negative electrode active material (precursor) to unite, and the like. However, the slurry packing and coating method and dipping method are preferred from the viewpoint of the lyophilic properties of the skeleton forming agent and electrode production costs.

In addition, the method for producing a negative electrode for lithium-ion secondary batteries according to the present embodiment has a second step of forming the skeleton of the negative electrode active material layer by impregnating the negative electrode layer precursor formed in the first step with a skeleton forming agent including a silicate having a siloxane bond or a phosphate having a phosphate bond and drying to cure the skeleton forming agent. For example, the silicate having a siloxane bond or the phosphate having a phosphate bond is purified by a dry or wet method, and this is adjusted with water to prepare a skeleton forming agent liquid including a skeleton forming agent. At this time, a surfactant may be mixed. As the dry method, for example, an alkali metal silicate can be produced by adding $SiO_2$ to water in which an alkali metal hydroxide is dissolved, and treating the obtained solution at 150° C. to 250° C. in an autoclave. As the wet method, for example, an alkali metal silicate can be produced by burning a mixture of an alkali metal carbonate compound and $SiO_2$ at 1000° C. to 2000° C., and dissolving this in hot water.

The skeleton forming agent liquid is then coated on the surface of the negative electrode layer precursor to coat the negative electrode active material. The method for coating the surface with a skeleton forming agent can be carried out by a method in which the negative electrode layer precursor is impregnated with the skeleton forming agent liquid retained in a tank, also a method in which the skeleton forming agent is added dropwise and applied to the surface of the negative electrode layer precursor, spray coating, screen printing, a curtain method, spin coating, gravure coating, die coating or the like. The skeleton forming agent coated on the surface of the negative electrode layer precursor permeates into the inside of the negative electrode and enter into e.g. gaps between the negative electrode active material and the conductive additive. Drying is carried out by heat treatment to cure the skeleton forming agent. Because of this, the skeleton forming agent forms the skeleton of the negative electrode active material layer.

The above heat treatment is preferably 80° C. or higher, more preferably 100° C. or higher and desirably 110° C. or higher because the heat treatment time can be shortened and the strength of the skeleton forming agent is improved at higher temperature. It should be noted that the upper temperature limit of the heat treatment is not particularly limited as long as a current collector is not melted, and for example, the temperature may be increased to about 1000° C., which is the melting point of copper. In conventional electrodes, the upper temperature limit has been estimated at much lower than 1000° C. because a binder can be carbonized or a current collector can be softened. In the present embodiment, however, the upper temperature limit is 1000° C. because using a skeleton forming agent the skeleton forming agent shows excellent heat resistance and the strength thereof is stronger than that of a current collector.

In addition, the heat treatment can be carried out by retaining 0.5 to 100 hours. The atmosphere for heat treatment may be air; however, the treatment is preferably carried out under a non-oxidizing atmosphere to prevent the oxidation of a current collector.

Here, the method for producing a negative electrode for lithium-ion secondary batteries in the present embodiment is controlled so that the ratio of the density B of the negative electrode layer formed in the second step to the density A of the negative electrode layer precursor formed in the first step, B/A, will be $0.9 < B/A < 1.4$. Specifically, the ratio of the density B of the negative electrode layer to the density A of the negative electrode layer precursor, B/A, (i.e. density increase ratio) is controlled to obtain the above range by selecting the type of material, the amount of material, treatment conditions and the like. By doing this, the impregnated skeleton forming agent enters into the inside of the negative electrode layer, and thus the skeleton forming agent is also placed on the interface with the current collector in the negative electrode layer. Therefore, high mechanical strength is obtained and cycle life characteristics are improved due to skeleton formation by the skeleton forming agent uniformly placed on the whole negative electrode layer.

In addition, in the method for producing a negative electrode for lithium-ion secondary batteries in the present embodiment, the density A of the negative electrode layer precursor formed in the first step is 0.5 to 2.0 g/cm$^3$. Because of this, the ratio of the density B of the negative electrode layer to the density A of the negative electrode layer precursor, B/A, (i.e. density increase ratio) can be more certainly within the above range, and the above-described effect by the skeleton forming agent can be increased. The range of the density A of the negative electrode layer precursor is more preferably 0.6 to 1.5 g/cm$^3$. When the density A of the negative electrode layer precursor is 0.6 g/cm$^3$ or more, a reduction in energy density due to a reduction in electrode density can be suppressed, and when the density A is 1.5 g/cm$^3$ or less, a reduction in capacity can be suppressed.

The positive electrode for lithium-ion secondary batteries of the present invention has a step of producing a positive electrode by coating a positive electrode material including a positive electrode active material, a conductive additive and a binder on a current collector, drying and rolling. For example, rolled aluminum foil with a thickness of 10 µm is produced, and the aluminum foil wound in roll form in advance is prepared. As the positive electrode material, a positive electrode active material, a binder, a conductive additive and the like are mixed to prepare a paste slurry. Next, the positive electrode material slurry is coated on the surface of aluminum, dried and then roll-pressed to obtain a positive electrode. A foamed porous body made of metal may be also used as a current collector. An electrode mixture is characterized by being packed in this current collector The method for packing an electrode mixture in the current collector is not particularly limited, and for example, there is a method in which a slurry including an electrode mixture is packed in the inside of a network structure of the current collector with pressure applied by a press fit method. After packing the electrode mixture, the density of the electrode mixture can be improved by drying and then pressing the packed current collector and thus can be adjusted so that a desired density can be obtained.

Finally, the obtained negative electrode and positive electrode are each cut into a desired size and then joined to each other with a separator put between the electrodes, and a lithium-ion secondary battery can be obtained by sealing with the obtained product immersed in an electrode solution. The structure of the lithium-ion secondary battery can be applied to existing battery forms and structures such as laminated batteries and wound batteries.

Effect

According to the present embodiment, the following effects are displayed. In the present, embodiment, the negative electrode 1 for nonaqueous electrolyte secondary batteries was made, having the current collector 11 made of porous metal, and the negative electrode material 12 placed in pores of the porous metal, the negative electrode material 12 including the negative electrode active material 13 including a silicon-based material, the skeleton forming agent 14 including a silicate having a siloxane bond, the conductive additive 15, the binder 16 and the fibrous material 17.

First, using porous metal as the current collector 11, the negative electrode material 12 can be fixed in a micron size region by a porous metal skeleton, and peeling and cracks of the negative electrode can be suppressed. In addition, the negative electrode material 12 can be fixed in a nano size region by using the skeleton forming agent 14 as the negative electrode material 12. More specifically, because the third phase by the skeleton forming agent 14 is formed on the interface between the current collector 11 made of porous metal and the negative electrode active material 13, falling during expansion and contraction can be suppressed by strongly binding the negative electrode active materials 13 in the negative electrode material 12, and durability deterioration can be suppressed. Furthermore, as shown in FIG. 2, the fibrous material 17 adheres as cross-linked between the negative electrode active materials 13, and thus can absorb the expansion and contraction of the negative electrode. As a result, the structural deterioration of the electrode is suppressed, and breaking of conductive paths can be prevented, and thus an improvement in cycle durability can be also achieved. In particular, when the fibrous material 17 has a longer fiber or a higher aspect ratio, it can be more certainly cross-linked between the negative electrode active materials 13, and can certainly follow expansion and contraction. Therefore, the expansion and contraction of the negative electrode can be more effectively absorbed. Therefore, although the negative electrode active material 13 including a silicon-based material having high capacity and extremely large expansion and contraction coefficients is used for the negative electrode, because in addition to the conductive additive 15 and the binder 16, the fibrous material 17 adhering as cross-linked between the negative electrode active materials 13 is included in the negative electrode material 12, even when full charge discharge cycles with a SOC of 0 to 100 are carried out, the expansion of the negative electrode active material can be absorbed, and thus the structure of the negative electrode can be maintained. Therefore, high capacity by thickening the film of a negative electrode, falling when having a high basis weight, and breaking of conductive paths can be suppressed, and an improvement, in cycle durability can be achieved.

It should be noted that the present invention is not limited to the above embodiment, and variants and improvements are included in the present invention as long as the object of the present invention can be achieved. For example, nonaqueous electrolyte secondary batteries are secondary batteries (storage device) using a nonaqueous electrolyte such as an organic solvent as an electrolyte, and in addition to lithium-ion secondary batteries, sodium-ion secondary batteries, potassium-ion secondary batteries, magnesium-ion secondary batteries, calcium-ion secondary batteries and the like are included. In addition, lithium-ion secondary batteries are secondary batteries having a nonaqueous electrolyte not containing water as a main component, and mean batteries including lithium ion as a carrier for electric conduction. For example, lithium-ion secondary batteries, lithium metal batteries, lithium polymer batteries, all-solid lithium batteries, lithium-ion air batteries and the like correspond thereto. The same applies to other secondary batteries. Here, the nonaqueous electrolyte not containing water as a main component means that the main component in an electrolyte is not water. That is, it is a known electrolyte used for nonaqueous electrolyte secondary batteries. This electrolyte can function as a secondary battery even when containing a little amount of water; however, water has bad effect on cycle characteristics, storage characteristics, and input and output characteristics of secondary batteries, and thus it is desired that an electrolyte contain water as little as possible. Realistically, water in an electrolyte is preferably 5000 ppm or less.

EXAMPLES

Examples of the present invention will now be described. It should be noted, however, that the present invention is not limited to these examples.

Example 1

Production of Negative Electrode

A slurry including silicon (Si, particle diameter 1 to 3 μm) as the negative electrode active material, carbon black (CB) as the conductive additive, polyvinylidene difluoride (PVdF) as the binder, and cellulose nanofiber (CNF) as the fibrous material was prepared. The prepared slurry was then packed in "Nickel Celmet" (registered trademark) manufactured by Sumitomo Electric Industries, Ltd. as the current collector, dried and then treated with adjusted pressure to obtain a negative electrode layer precursor.

A 10 mass % aqueous solution of $Na_2O \cdot 3SiO_2$ was prepared as skeleton forming agent liquid including the skeleton forming agent and water. The negative electrode layer precursor obtained above was immersed in the prepared skeleton forming agent liquid. After immersion, the negative electrode precursor was heated and dried at 160° C. to obtain a negative electrode having a negative electrode layer formed therein.

Production of Positive Electrode $LiNi_{0.5}Co_{0.2}Mn_{0.3}O_2$ (particle diameter 5 to 15 μm) was prepared as a positive electrode active material. Ninety six mass % of the positive electrode active material, mass % of carbon black as the conductive additive, and 2 mass % of polyvinylidene difluoride (PVdF) as a binding agent were mixed, and the obtained mixture was properly dispersed to produce a positive electrode mixture slurry. Foamed aluminum with a thickness of 1.0 mm, a porosity of 95%, 46 to 50 cells/inch, a pore diameter of 0.5 mm and a specific surface area of 5000 $m^2/m^3$ was prepared as a current collector. The produced positive electrode mixture slurry was applied to the current collector by a press fit method so that the coated amount was 90 $mg/cm^2$. The current collector was dried in vacuum at 120° C. for 12 hours, and then roll-pressed at a pressure of 15 ton to produce a positive electrode for lithium-ion secondary batteries, in which the electrode mixture was packed in pores of foamed aluminum.

Production of Lithium-ion Secondary Battery

A microporous film with a thickness of 25 μm, a three layer laminated body of polypropylene/polyethylene/polypropylene, was prepared as a separator, and was punched out in 100 mm in length ×90 mm in width. The positive electrode for lithium-ion secondary batteries and the negative electrode for lithium-ion secondary batteries obtained above are laminated in the order of positive electrode/separator/negative electrode/separator/positive electrode/negative electrode to produce an electrode laminated body.

A tab lead was then joined to a collecting region of each electrode by ultrasonic welding. The electrode laminated body having the tab lead welded and joined thereto was inserted into an aluminum laminate for secondary batteries processed into the form of bag by heat sealing to produce a laminate cell. Ethylene carbonate, dimethyl carbonate and ethyl methyl carbonate were mixed in a volume ratio of 3:4:3, and in the obtained solvent, 1.2 mol $LiPF_6$ was dissolved to prepare a solution as an electrolyte solution, and the electrolyte solution was injected into the above laminate cell to produce a lithium-ion secondary battery.

Examples 2, 3

The lithium-ion secondary batteries in Examples 2 and 3 were obtained in the same manner as in Example 1 except that the composition of the negative electrode was changed as shown in Table 1. In Example 2, vapor grown carbon nanofiber (VGCF) was used as the fibrous material.

Comparative Example 1

As shown in Table 1, the lithium-ion secondary battery in Comparative Example 1 was obtained in the same manner as in Example 1 except that a fibrous material was not used when producing the negative electrode.

TABLE 1

| | Current collector | Skeleton forming agent | Amount of skeleton forming agent | Composition | Basis weight of active material |
|---|---|---|---|---|---|
| Example 1 | Foamed Ni | $K_2O \cdot 3SiO_2$ | 1.41 | Active material Si/CB/PVdF/CNF = 90/5/4.5/0.5 (mass %) | 6.16 |
| Example 2 | Foamed Ni | $K_2O \cdot 3SiO_2$ | 1.41 | Active material Si/CB/PVdF/VGCF = 90/4/5/1 (mass %) | 6.16 |
| Example 3 | Foamed Ni | $K_2O \cdot 3SiO_2$ | 1.41 | Active material Si/CB/PVdF/CNF = 90/4/5/1 (mass %) | 6.16 |
| Comparative Example 1 | Foamed Ni | $K_2O \cdot 3SiO_2$ | 1.41 | Active material Si/CB/PVdF = 90/5/5 (mass %) | 6.16 |

Measurement of Capacity Retention Rate

The initial capacity and the battery capacity after 50 charge/discharge cycles of a battery in each Example and Comparative Example were measured to calculate a capacity retention rate. In the cycle test, a cycle of 4.2 V-CCCV charge (CV time: an hour) and 3 V-CC discharge at a test environment temperature of 25° C. and a current density of 0.1 C-rate were carried out 50 cycles in total.

Measurement of Resistance Increase Rate

The initial internal resistance value and the internal resistance value after 50 charge/discharge cycles of a battery in each Example and Comparative Example were measured to calculate a resistance increase rate. The produced lithium-ion secondary battery was allowed to stand at a measurement temperature (25° C.) for an hour and the state of charge (SOC) was adjusted to 50%. Next, pulse discharge was performed at a C rate of 0.2 C for 10 seconds, and the voltage after 10 seconds discharge was measured. The voltage after 10 seconds discharge to the current at 0.2 C was plotted with current values along the abscissa and voltage along the ordinate. Next, after the lithium-ion secondary battery was allowed to stand for 5 minutes, supplemental charge was performed to return the SOC to 50%, and the lithium-ion secondary battery was then allowed to stand for another 5 minutes. Next, the above operations were performed at each C-rate, 0.5 C, 1 C, 1.5 C, 2 C, 2.5 C and 3C, and the voltage after 10 seconds discharge to the current at each C rate was plotted. The slope of the approximation straight line obtained from plots was used as an initial cell resistance. Using the cell after the above 50 cycle durability, the post-durability cell resistance was found in the same manner as for the measurement of the initial cell resistance, and the post-durability cell resistance to the initial cell resistance was found and used as a resistance increase rate.

TABLE 2

| | Fibrous material | Capacity retention rate (50 cycles) | Resistance increase rate (50 cycles) |
|---|---|---|---|
| Example 1 | CNF | 48% | 410% |
| Example 2 | VGCF | 39% | 621% |
| Example 3 | CNT | 35% | 534% |
| Comparative Example 1 | Foamed Ni | 5% | 965% |

Table 2 is a table which shows the capacity retention rate and the resistance increase rate after 50 cycles in Examples 1 to 3 and Comparative Example 1. As can be seen from Table 2, it was observed that a negative electrode for nonaqueous electrolyte secondary batteries, by which the structural deterioration of the electrode is suppressed, and cycle characteristics can be improved by absorbing the expansion and contraction of a silicon-based active material placed in the inside of a current collector made of porous metal, and a nonaqueous electrolyte secondary battery including the same were obtained according to the present examples.

Explanation of Reference Numerals

1: Negative electrode for nonaqueous electrolyte secondary batteries
11: Current collector
12: Negative electrode material
13: Negative electrode active material
14: Skeleton forming agent
15: Conductive additive
16: Binder
17: Fibrous material

What is claimed is:

1. A negative electrode for nonaqueous electrolyte secondary batteries, having a current collector made of porous metal, and a negative electrode material placed in pores of the porous metal,
   the negative electrode material comprising a negative electrode active material comprising a silicon-based material; a skeleton forming agent comprising a silicate having a siloxane bond; a conductive additive; a binder; and a fibrous material, wherein
   the porous metal has an average pore diameter of 500 μm or less,
   the fibrous material is at least one selected from a group consisting of: cellulose nanofiber having a fiber diameter of 0.001 μm to 0.02 μm and a fiber length of 0.5 μm to 5 μm; vapor grown carbon nanofiber having a fiber diameter of 0.05 μm to 0.6 μm and a fiber length of 0.5 μm to 5 μm; and carbon nanotube having a fiber diameter of 0.001 μm to 0.02 μm and a fiber length of 0.5 μm to 5 μm, and
   the negative electrode material is fixed in a nano size region by the skeleton forming agent, and is fixed in a micron size region by the porous metal.

2. The negative electrode for nonaqueous electrolyte secondary batteries according to claim 1, wherein an aspect ratio of the cellulose nanofiber is 2.5 to 5000.

3. The negative electrode for nonaqueous electrolyte secondary batteries according to claim 1, wherein an aspect ratio of the vapor grown carbon nanofiber is 2 to 100.

4. The negative electrode for nonaqueous electrolyte secondary batteries according to claim 1, wherein an aspect ratio of the carbon nanotube is 2.5 to 5000.

5. The negative electrode for nonaqueous electrolyte secondary batteries according to claim 1, wherein the skeleton forming agent comprises a silicate represented by general formula (1) below:

$$A_2O \cdot nSiO_2 \quad \text{formula (1)}$$

in the above general formula (1), A represents an alkali metal, and n is 1.6 or more and 3.9 or less.

6. The negative electrode for nonaqueous electrolyte secondary batteries according to claim 1, wherein the porous metal is a foamed metal.

7. A nonaqueous electrolyte secondary battery, comprising the negative electrode for nonaqueous electrolyte secondary batteries according to claim 1.

* * * * *